United States Patent [19]
Akutagawa et al.

[11] Patent Number: 5,704,335
[45] Date of Patent: Jan. 6, 1998

[54] THROTTLE VALVE APPARATUS FOR INTERNAL COMBUSTION ENGINE

[75] Inventors: Masaki Akutagawa, Kariya; Yukio Mori, Nagoya, both of Japan

[73] Assignee: Nippondenso Co., Ltd., Kariya, Japan

[21] Appl. No.: 680,269

[22] Filed: Jul. 11, 1996

[30] Foreign Application Priority Data

Jul. 14, 1995 [JP] Japan ................... 7-178756

[51] Int. Cl.⁶ ........................... F02M 69/32
[52] U.S. Cl. ............. 123/337; 123/339.23; 261/DIG. 20
[58] Field of Search ................... 123/336, 337, 123/339.23, 442, 470, 472; 251/305; 261/65, DIG. 20

[56] References Cited

U.S. PATENT DOCUMENTS

| | | |
|---|---|---|
| 3,974,806 | 8/1976 | Nohira ........................... 261/1 |
| 4,277,424 | 7/1981 | Shivers, Jr. ............. 261/DIG. 20 |

FOREIGN PATENT DOCUMENTS

| | | | |
|---|---|---|---|
| 137470 | 4/1985 | European Pat. Off. . | |
| 57-126560 | 8/1982 | Japan . | |
| 2-046074 | 3/1990 | Japan . | |
| 2-91431 | 3/1990 | Japan ................... | 123/337 |
| 3-017156 | 2/1991 | Japan . | |

Primary Examiner—Tony M. Argenbright
Attorney, Agent, or Firm—Cushman, Darby & Cushman IP Group of Pillsbury, Madison & Sutro LLP

[57] ABSTRACT

A keep-back recess for blocking water, which is likely to be transmitted to a throttle valve along an inner peripheral surface of an intake pipe, is formed at an inner surface of a throttle body. The keep-back recess collects and stores water so that the throttle valve is prevented from freezing without leading engine cooling water in the throttle body.

21 Claims, 4 Drawing Sheets

THROTTLE VALVE APPARATUS FOR INTERNAL COMBUSTION ENGINE

BACKGROUND OF THE INVENTION

1. Field of the Invention

The present invention relates to a throttle valve apparatus for internal combustion engine having functions of preventing throttle valve inoperativeness caused by freezing of water which flows from the upstream side of the throttle valve along inner peripheral surface of an intake pipe in winter.

2. Description of Related Art

Conventional antifreezing structure of a throttle valve is shown in FIG. 7. According to the conventional throttle valve apparatus for internal combustion engine, to prevent a throttle valve 1 from freezing caused by water from the upstream side of the throttle valve 1 along inner peripheral surface of an intake pipe 2 in winter, a cooling water passage 4 is formed in a throttle body 3 to lead engine cooling water into the cooling water passage 4 and to warm the throttle body 3.

However, the above conventional apparatus needs to connect an inlet pipe 5 for the cooling water passage 4 of the throttle body 3 and an engine cooling unit by using a pipe, a hose or the like. Therefore, it has a disadvantage that the parts, like the pipe, the hose and the like, cost as well as difficulties in assembling into an engine space which have little vacant space. Furthermore, it has a disadvantage that the antifreezing function by engine cooling water is useless for a car when left in a cold environment for a long time, because the temperature of engine cooling water drops by heat radiation as time goes by after stopping its engine.

Lately, the throttle body 3 has been proposed to be made by resin to reduce the cost of the throttle body 3 or to integrate it with other parts. However, it is difficult to warm the throttle body 3 over the ice point in cold area only by leading engine cooling water because the heat conductivity of resin is small. In this case, leading engine cooling water can not prevent the throttle valve 1 from freezing.

This kind of antifreezing technique using such warmed water is disclosed, for example, in JP-U-57-126560.

In JP-U-3-17156, an antifreezing structure of a throttle valve without leading engine cooling water into the throttle body is disclosed. According to JP-U-3-17156, a step portion whose height of a surge tank side is lower than a flange side is formed at a connecting portion between the flange at the downstream side of a throttle body and the surge tank to prevent the throttle valve from freezing which is caused by water resulting from dew condensation in the surge tank (common chamber) connected to the downstream side of the throttle body. Thus, water resulting from dew condensation in the surge tank does not flow into the throttle body.

Although the above antifreezing structure is a countermeasure for water resulting from dew condensation in the surge tank when its engine is equipped with EGR (exhaust gas recirculation), it is not effective for water which comes from the upstream side of the throttle valve along inner peripheral surface of an intake pipe with an air flow. For conventional engines, the problem is water which comes from the upstream side of the throttle valve and the most important technical problem nowadays is how to prevent the throttle valve from freezing which is caused by such water.

JP-U-2-46074 discloses a continuously tapered slope on the periphery of the upstream side of a throttle body. However, this tapered slope can not protect the periphery of a throttle valve from water sufficiently because the drop of water goes beyond the tapered slope.

SUMMARY OF THE INVENTION

The present invention has an object to provide an improved throttle valve apparatus for internal combustion engine considering problems of the conventional technologies.

Another object of the present invention is to provide a throttle valve apparatus for internal combustion engine which prevents freezing of water between a throttle valve and a throttle body wall.

Another object of the present invention is to provide a throttle valve apparatus for internal combustion engine which prevents flow of water between a throttle valve and a throttle body wall.

Another object of the present invention is to provide a throttle valve apparatus for internal combustion engine which prevents the movement of water drops toward the periphery of a throttle valve.

Another object of the present invention is to provide a throttle valve apparatus for internal combustion engine which prevents the generation of water drops at the periphery of a throttle valve.

In a throttle valve apparatus for internal combustion engine according to a first aspect of the present invention, a keep-back recess for blocking water transmitted from the upstream side of a throttle valve along an inner peripheral surface of an intake pipe is formed at least on a lower portion of an inner surface of a throttle body. This recess prevents the throttle valve from freezing.

The present invention permits to provide a simplified throttle valve apparatus without leading engine cooling water in the throttle body.

Since the structure to lead engine cooling water in the throttle body is not necessary, there is no need to connect the throttle body and an engine cooling unit by using a pipe, a hose or the like. Therefore, the attachment of the throttle body in an engine room can be simplified and the reduction of the number of parts and the cost thereof can be realized.

According to another aspect of the present invention, a throttle body has a double-pipe structure and a continuous keep-back recess at a radial outside. This construction blocks water transmitted from the upstream side of the throttle valve at the continuous keep-back recess and simplifies forming of the throttle body.

BRIEF DESCRIPTION OF THE DRAWINGS

Additional objects and advantages of the present invention will be more readily apparent from the following detailed description of preferred embodiments thereof when taken together with the accompanying drawings, in which.

DETAILED DESCRIPTION OF PRESENTLY PREFERRED EMBODIMENTS

Preferred embodiments of the present invention are hereinafter described with reference to the accompanying drawings.

(FIRST EMBODIMENT)

First, a first embodiment of the present invention is hereinafter explained with reference to FIG. 1 through FIG. 3.

Figure 1:
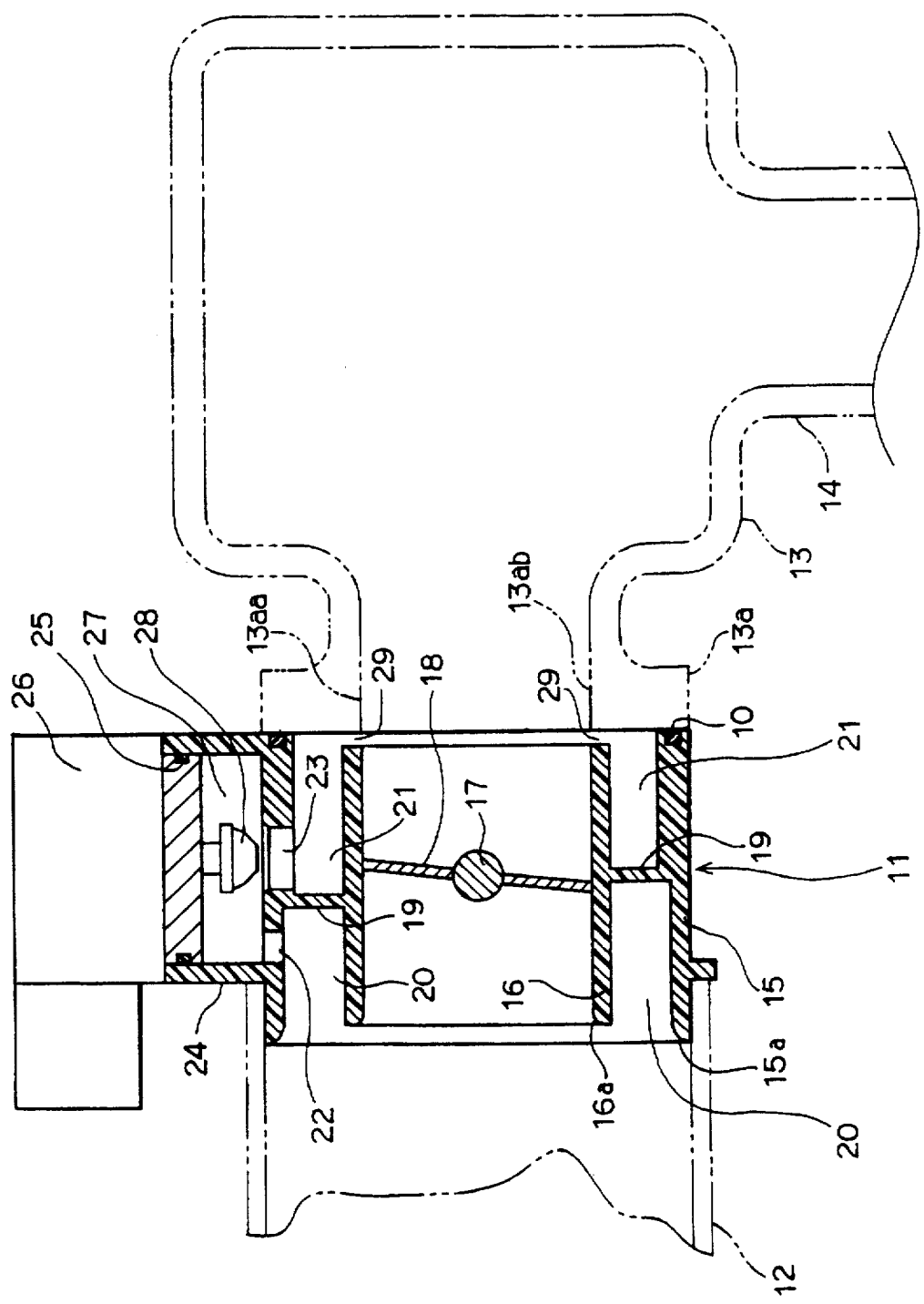
FIG. 1 is a vertical sectional view of a throttle body according to a first embodiment of the present invention.

In FIG. 1, a throttle body 11 is fixed to a downstream portion of an intake pipe 12, which consists of a rubber duct, by a belt or the like which is not shown. An air cleaner which is not shown is provided at an upstream portion of the intake pipe 12. A surge tank 13 is connected to the downstream side of the throttle body 11 with a sealing member 10 by a bolt or the like which is not shown. An intake air is led to respective cylinders of an engine which is not shown from the surge tank 13 through an intake manifold 14.

The throttle body 11 is integrally molded out of heat resistant resin in a shape of double-pipe whose cylindrical outer pipe portion 15 is concentric with a cylindrical inner pipe portion 16 which is a little shorter than the outer pipe portion 15. The inner pipe portion 16 forms an intake passage and a throttle valve 18 is built in the center of the intake passage by a shaft 17.

The space between the outer pipe portion 15 and the inner pipe portion 16 is divided in an upstream space 20 and a downstream space 21 by a continuous partition wall 19 at the peripheral center thereof. The upstream space 20 functions as a keep-back recess, to keep back water which is transmitted along inner peripheral surface of the intake pipe 12.

Both upstream ends of the outer pipe portion 15 and the inner pipe portion 16 are formed to have round shapes 15a and 16a respectively to reduce air flow resistance of the intake air. The upstream end of the inner pipe 16 is recessed from the upstream end of the outer pipe portion 15 in a direction of flow of air to maximize the upstream space 20 with minimized amount of material.

The upstream space (the keep-back recess) 20 and the downstream space 21 have an air inlet 22 and an air outlet 23 at the upper wall portion of the outer pipe portion 15 respectively. A surrounding wall 24 is integrally molded with the outer pipe portion 15 at the outer surface of the outer pipe portion 15 to surround the air inlet 22 and the air outlet 23. Upper open end portion of the surrounding wall 24 is closed by fitting a stepping motor 26 at the upper open end portion with an insertion of a sealing material 25 so that a bypass air passage 27 through which air flows the upstream space (the keep-back recess) 20, the air inlet 22, an inner space surrounded by the surrounding wall 24, the air outlet 23 and the downstream space 21 respectively is formed.

An idle speed control valve (hereinafter referred to as "ISC valve") 28, which is driven by the stepping motor 26 is provided at a facing position to the air outlet 23 inside the bypass air passage 27. An opening degree of the ISC valve 28 (i.e., an opening between the ISC valve 28 and the air outlet 23) is controlled by the stepping motor 26 with a feedback control when the engine is idling so that the idle rotational speed is stabilized. Upper edge of the air outlet 23 forms a slope corresponding to the shape of the ISC valve 28 and functions as a valve seat.

An opening area of a flange 13a which is on the upstream end of the surge tank 13 is almost the same as it of the inner pipe portion 16 which is an air passage area of the throttle body 11 so that air flow resistance can be small when air flows from the inner pipe portion 16 to the surge tank 13.

An upper (the side of the ISC valve 28) end surface 13aa of the flange 13a covers the air outlet 23 so that dirt from downstream side may not have a bad influence upon the ISC valve 28. A lower (the side of the ground) end surface 13ab of the flange 13a is formed to collect and store water in the downstream space 21 as described hereafter. The lower end surface 13ab may be formed at a place which is lower than that shown in FIG. 1 so that water may not jump across a gap 29 into the throttle valve 18.

The gap 29 is formed between the inner pipe portion 16 and the flange 13a at ends thereof. Bypassed air through the bypass air passage 27 flows into the surge tank 13 through the gap 29. Water resulting from dew condensation in the surge tank 13 flows into the downstream space 21 in the throttle body 11 through the gap 29 and stored in the downstream space 21.

Figure 2:
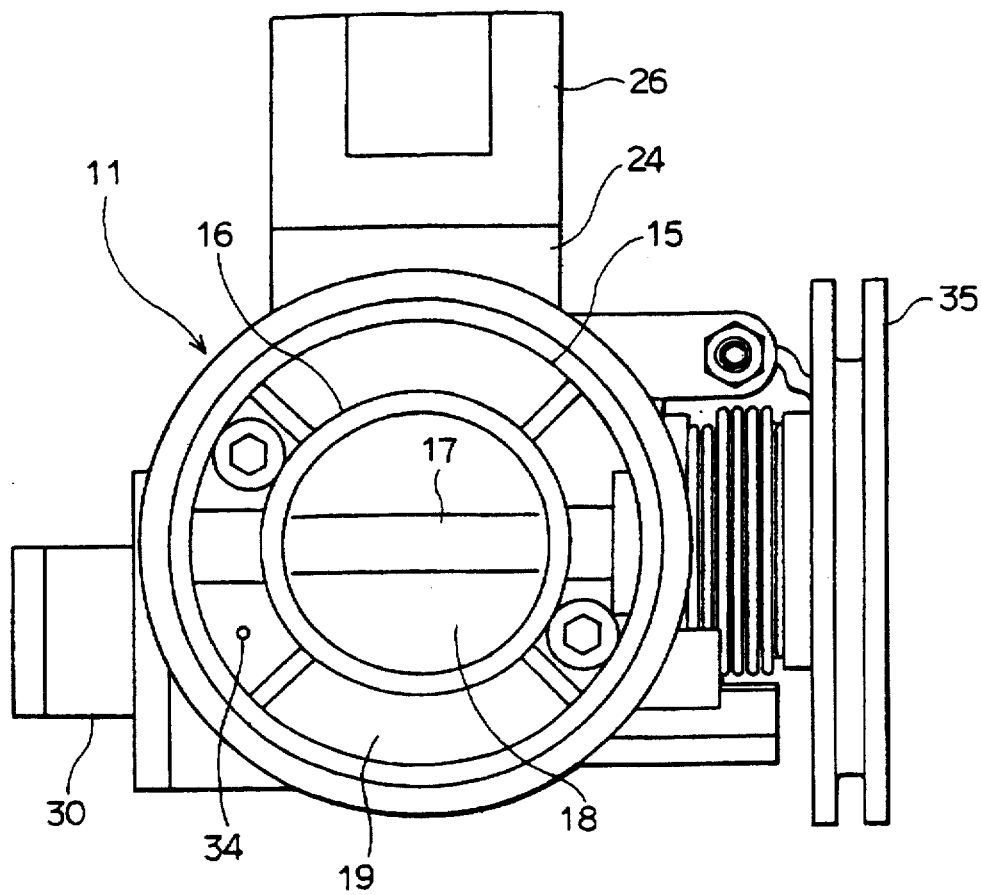
FIG. 2 is a front view of the throttle body according to the first embodiment of the present invention.
Figure 3:
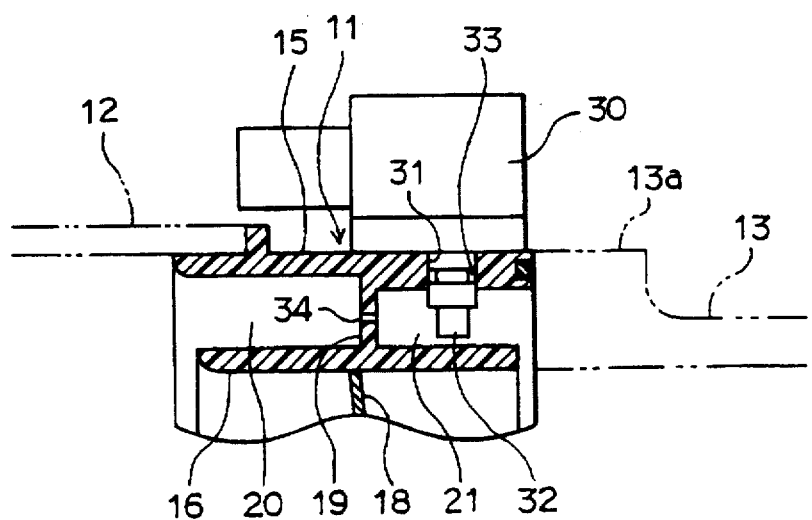
FIG. 3 is a partially sectional view of the periphery of a pressure sensor for an intake pipe according to the first embodiment of the present invention.

As shown in FIG. 2 and FIG. 3, an intake pipe pressure sensor 30 which is comprised of a semiconductor pressure sensor is attached to the left surface of the throttle body 11. A pressure detecting portion (pressure induction portion) 32 of the intake pipe pressure sensor 30 locates in the downstream space 21 through a sensor induction hole 31 which is formed at outer wall (the outer pipe portion 15) of the downstream space 21. A sealing member 33 seals the gap between the sensor induction hole 31 and the pressure detecting portion 32. Furthermore, a purge hole 34 in a small diameter is formed opposing the pressure detecting portion 32 on the partition wall 19. Air flows through the purge hole 34 toward the pressure detecting portion 32.

As shown in FIG. 2, a throttle lever 35 which is provided at the right surface of the throttle body 11 is connected to the shaft 17 of the throttle valve 18. An accelerator wire (not shown) connects the throttle lever 35 and an accelerator pedal (not shown). Thus, the throttle lever 35 rotates according to the degree of stepping the accelerator pedal, and the throttle valve 18 rotates together with the throttle lever 35.

According to the first embodiment described above, since the throttle body 11 has a double-pipe structure and the keep-back recess (upstream space) 20 which is opposed to the upstream side has a continuous ring shape, water is certainly stopped at the keep-back recess 20 when the water reaches the throttle body 11 by transmitting along the inner surface of the intake pipe 12 from the upstream side of the throttle valve 18 and the water is prevented from reaching the throttle valve 18.

Furthermore, since the opening of the downstream space 21 is disposed so as to face the surge tank 13 through the gap 29, water caused by dew condensation in the surge tank 13 flows into the downstream space 21 through the gap 29 and stored in it when the water is transmitted to the throttle body 11 and the water is prevented from reaching the throttle valve 18.

Thus, water collected and stored in the keep-back recess (upstream space) 20 and the downstream space 21 freeze therein and it prevents the throttle valve 18 from freezing without leading engine cooling water in the throttle body 11 in winter. Furthermore, the heat transmission from the outer pipe portion 15 to the inner pipe portion 16 is small because the partition wall 19 is thin. Therefore, the throttle valve 18 does not freeze even when water freeze at the keep-back recess (upstream space) 20 and the downstream space 21. Since the first embodiment does not require the structure to lead engine cooling water in the throttle body 11, there is no need to connect the throttle body 11 and an engine cooling unit by using a pipe, a hose or the like. Therefore, the attachment of the throttle body 11 in the engine room can be simplified drastically and the reductions in the number of the parts and in the cost thereof can be realized.

According to the first embodiment, the bypass air passage 27 is formed between the keep-back recess (upstream space) 20 and the downstream space 21 and the ISC valve 28 is provided utilizing the bypass air passage 27. Since the keep-back recess 20 and the bypass air passage 27 are formed by utilizing the double-pipe structure of the throttle body 11, the structure becomes easy to mold integrally and the simplification of the structure of a die unit and reducing the molding cost can be achieved.

Although the ISC valve 28 is provided at the bypass air passage 27 in the first embodiment, it may be preferable that a bypass screw is provided so as to face the air inlet 22. The bypass screw is used to initialize an idle rotational speed at a factory or to manually adjust the amount of intake air (air flow area) when the amount of the intake air at a state that the throttle valve 18 is fully closed is decreased with time because of the attachment of dirt in the intake air and the like. It is possible that at least one of the ISC valve 28 and the bypass screw is equipped on the throttle body 11.

Since the pressure detecting portion 32 of the intake pipe pressure sensor 30 locates at the downstream space 21 in the throttle body 11 in the first embodiment, the downstream space 21 can also serve as a space for the location of the pressure detecting portion 32. Therefore, there is no need to provide another separate space for the pressure detecting portion, the manufacturing cost can be reduced and the attachment of the intake pipe pressure sensor 30 becomes easier.

According to the first embodiment, the deterioration of the accuracy of detecting the intake pipe pressure caused by foreign substance adhered to the pressure detecting portion 32 can be reduced by only forming the purge hole 34 on the partition wall 19 at the place which faces the pressure detecting portion 32 because the adhesion of foreign substance to the pressure detecting portion 32 can be avoided by constant air flow to the pressure detecting portion 32.

As mentioned above, according to the first embodiment, there is no need to warm the throttle body 11 by engine cooling water because the throttle valve 18 is prevented from freezing by blocking water at the keep-back recess (the upstream space) 20 and the downstream space 21. Therefore, large heat conductivity is not required for the material of the throttle body 11 and high antifreezing performance can be achieved even when the throttle body 11 is integrally molded out of resin whose heat conductivity is small. Furthermore, low cost and light weight can be achieved by molding resin for the throttle body 11 and integral molding of the throttle body 11, the intake pipe 12, the surge tank 13 and the like can also be realized.

Although the throttle valve 18 is rotated by using the accelerator wire in the first embodiment, it may be effective to use an electric motor instead of the accelerator wire to rotate the throttle valve 18.

The bypass air passage 27 through which air flows in the order of the upstream space (the keep-back recess) 20, the air inlet 22, an inner space surrounded by the surrounding wall 24, the air outlet 23 and the downstream space 21 is formed in the first embodiment, however, the bypass air passage 27 may be replaced with another bypass air passage which is formed by the upstream space (the keep-back recess) 20, a bypass air hole and the downstream space 21 by forming the bypass air hole on the partition wall 19 and by controlling an opening area of the bypass air hole by a bypass air flow controller, such as a slide valve.

The stepping motor 26 as a driver of ISC valve 28 in the first embodiment may be replaced with other actuators such as a rotary solenoid or a linear solenoid.

(SECOND EMBODIMENT)

Figure 4:
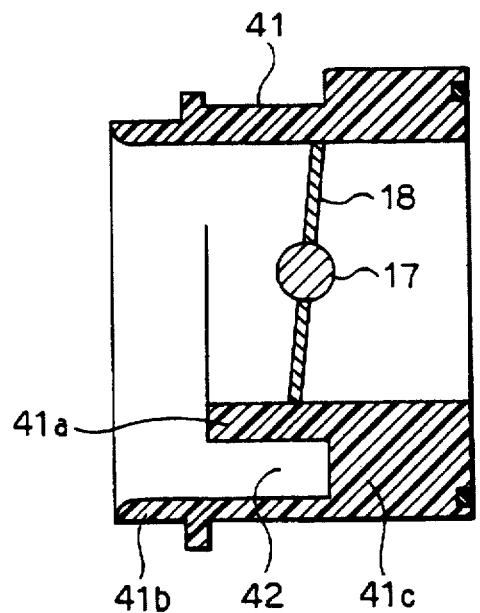
FIG. 4 is a vertical sectional view of a throttle body according to a second embodiment of the present invention.

Although the throttle body 11 has a double-pipe structure in the first embodiment, the second embodiment without a double-pipe structure as shown in FIG. 4 may be possible.

According to the second embodiment, a keep-back recess 42 is integrally molded out of resin at only lower portion of a throttle body 41 and an opening of the keep-back recess 42 faces the upstream side. An inner pipe portion 41a forms an inner wall, an outer pipe portion 41b forms an outer wall and a connecting pipe portion 41c which connects the inner pipe portion 41a and the outer pipe portion 41b forms a bottom wall. As a result, the opening of the keep-back recess 42 is formed in an arc shaped when viewed axially.

The second embodiment has a simple structure which has only the keep-back recess 42 without the bypass air passage 27 and the downstream space 21 provided in the first embodiment. The keep-back recess 42 formed at the lower portion of the throttle body 41 can block water from the upstream side because water transmitted from the upstream is gathered at the lower portion by gravity. Thus, the object of the present invention can be attained.

(THIRD EMBODIMENT)

Figure 5:
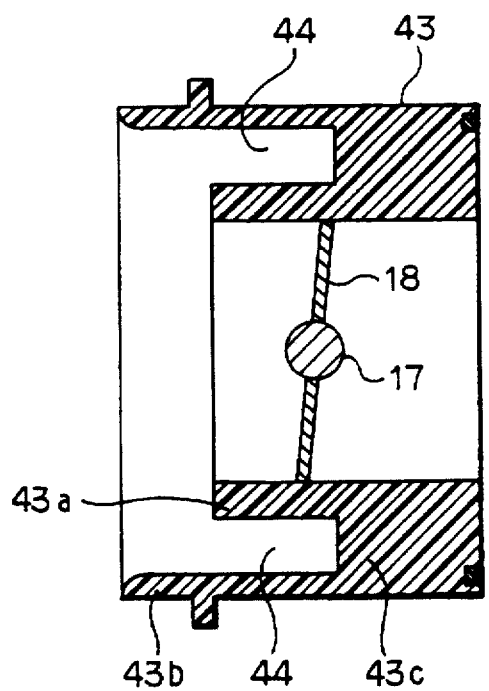
FIG. 5 is a vertical sectional view of a throttle body according to a third embodiment of the present invention.

According to the third embodiment, as shown in FIG. 5, a keep-back recess 44 which has a continuous ring shape is integrally molded out of resin with a throttle body 43 and an opening of the keep-back recess 44 faces the upstream side. The bypass air passage 27 and the downstream space 21 provided in the first embodiment are not formed in the third embodiment. An inner pipe portion 43a forms an inner wall, an outer pipe portion 43b forms an outer wall and a connecting pipe portion 43c which connects the inner pipe portion 43a and the outer pipe portion 43b forms a bottom wall. As a result, the opening of the keep-back recess 44 is formed in a ring shape when viewed axially.

(FOURTH EMBODIMENT)

Figure 6:
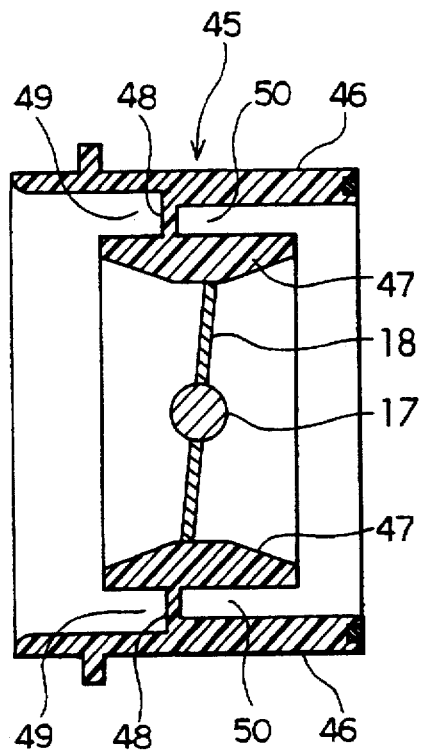
FIG. 6 is a vertical sectional view of a throttle body according to a fourth embodiment of the present invention.
Figure 7:
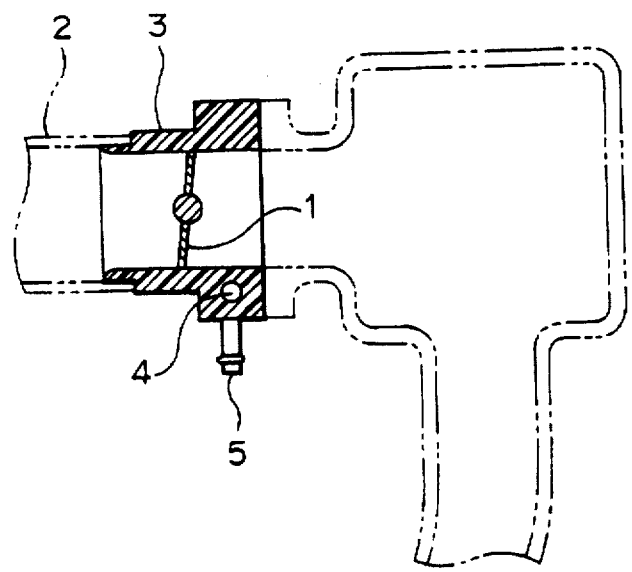
FIG. 7 is a vertical sectional view of a conventional throttle body.

According to the fourth embodiment shown in FIG. 6, a throttle body 45 is integrally molded out of resin in a shape of double-pipe whose outer pipe portion 46 is concentric with an inner pipe portion 47 which is a little shorter than the outer pipe portion 46. The space between the outer pipe portion 46 and the inner pipe portion 47 is divided into a keep-back recess (upstream space) 49 and a downstream space 50 by a continuous partition wall 48 at the peripheral center thereof.

In the fourth embodiment, slopes are formed at an inner surface of the inner pipe portion 47. The inner surface of the inner pipe portion 47 tapers from the central periphery to respective upstream and downstream sides to form the slopes. It becomes more difficult for water to reach the throttle valve 18 because of the slopes provided at the inner pipe portion 47. The bypass air passage 27 provided in the first embodiment is not formed in the fourth embodiment.

Although the throttle bodies in respective embodiments are formed by resin, metals such as aluminum may be used instead.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A throttle valve apparatus for an internal combustion engine having an intake pipe, said apparatus comprising:
   a throttle body connectable to said intake pipe and having a passage portion therein for an air flow from said intake pipe;
   a throttle valve provided in said passage portion of said throttle body for controlling an amount of intake air; and a keep-back recess provided in at least lower portion of said passage portion for blocking water transmitted from upstream side of said throttle valve along an inner surface of said intake pipe, said keep-back recess having an opening portion facing to said upstream side of said throttle valve.

2. A throttle valve apparatus for an internal combustion engine according to claim 1, wherein;

said throttle body includes an outer pipe portion and an inner pipe portion, said outer pipe portion and said inner pipe portion provides a double-pipe structure, said inner pipe portion includes an intake air passage, said throttle valve locates inside of said intake air passage, and a space between said outer pipe portion and said inner pipe portion is provided with a continuous partition wall at a circumference of said space to form an upstream space which corresponds to said keep-back recess.

3. A throttle valve apparatus for an internal combustion engine according to claim 2, wherein;

said space between said outer pipe portion and said inner pipe portion further forms a downstream space, and said downstream space includes an opening portion facing to downstream side of said throttle valve.

4. A throttle valve apparatus for an internal combustion engine according to claim 3, further comprising;

a bypass air passage for connecting said upstream space and said downstream space, and a bypass air flow controlling means for controlling an amount of air flow passing through said bypass air passage.

5. A throttle valve apparatus for an internal combustion engine according to claim 3, further comprising;

an intake pipe pressure sensor, wherein a pressure detecting portion of said intake pipe pressure sensor is located at said downstream space.

6. A throttle valve apparatus for an internal combustion engine according to claim 5, wherein said partition wall includes a purge hole facing said pressure detecting portion of said intake pipe pressure sensor.

7. A throttle valve apparatus for an internal combustion engine according to claim 1, wherein said throttle body is integrally molded out of resin.

8. An intake air controlling apparatus provided in an intake air passage for controlling intake air for an internal combustion engine, said apparatus comprising:

a body having a part of said intake air passage therein;

a shaft provided on said body;

a valve for controlling an opening area of said air intake passage in said body by rotation, said valve being supported rotatably by said shaft;

wherein said body includes;

an inner wall for forming a passage with said valve, an opening area of said passage being changed according to a rotation angle of said valve;

an outer wall located outside said inner wall, said outer wall being located substantially in parallel to said inner wall; and a bottom wall for forming between said inner wall and said outer wall a recess portion whose opening faces at least one of an upstream side and a downstream side of said intake air passage, said recess portion being substantially closed at opposite side of said intake air passage so that said bottom wall interconnects said inner wall and said outer wall.

9. An intake air controlling apparatus according to claim 8, wherein said inner wall includes an inner pipe.

10. An intake air controlling apparatus according to claim 9, wherein said outer wall includes an outer pipe.

11. An intake air controlling apparatus according to claim 10, wherein said bottom wall includes a partition wall located on an axial intermediate portion of at least one of said inner pipe and said outer pipe.

12. An intake air controlling apparatus according to claim 10, wherein said bottom wall includes a common pipe portion at an end of said inner pipe and said outer pipe in an axial direction.

13. An intake air controlling apparatus according to claim 10, wherein said recess portion includes a continuous ring shaped recess between said inner pipe and said outer pipe.

14. An intake air controlling apparatus according to claim 8, wherein said recess portion includes an arc shaped recess formed between said inner wall and said outer wall, said arc shaped recess provided at a part of circumference of said passage.

15. An intake air controlling apparatus according to claim 8, wherein said recess portion includes an upstream recess whose opening faces said upstream side.

16. An intake air controlling apparatus according to claim 15, wherein said recess portion further includes a downstream recess whose opening faces said downstream side.

17. An intake air controlling apparatus according to claim 8, wherein said recess portion includes a downstream recess whose opening faces said downstream side.

18. An intake air controlling apparatus according to claim 8, wherein;

said outer wall includes an outer pipe, said inner wall includes an inner pipe which locates inside said outer pipe, said bottom wall includes a partition wall which is located at a ring-shaped gap between said outer pipe and said inner pipe and which substantially prohibits air flow at said ring-shaped gap and which connects said outer pipe and said inner pipe with a small heat transfer, and said outer pipe and said inner pipe form a shape of double-pipe which has said ring-shaped gap and said partition wall between said outer pipe and said inner pipe.

19. An intake air controlling apparatus according to claim 18, wherein said partition wall includes a ring-shaped wall provided at said ring-shaped gap.

20. An intake air controlling apparatus according to claim 18, wherein;

said partition wall divides said ring-shaped gap into an upstream side and a downstream side, an upstream side of said valve is in communication with said upstream side of said ring-shaped gap, and a downstream side of said valve is in communication with said downstream side of said ring-shaped gap.

21. A throttle valve apparatus for an internal combustion engine having an intake pipe, said apparatus comprising:

a throttle body connectable to said intake pipe and having a passage portion therein for an air flow from said intake pipe;

a wall portion formed in said passage portion at least at a lower side of said passage, said wall portion forming radially outside thereof a keep-back recess with said throttle body and radially inside thereof an air flow passage, said keep-back recess being open at an upstream side thereof to said intake pipe and closed at a downstream side thereof to lead thereinto and store therein water in said intake pipe; and a throttle valve disposed in said passage portion at radially inside said wall portion for controlling an amount of intake air.

* * * * *